United States Patent [19]

Moll et al.

[11] Patent Number: 4,983,640
[45] Date of Patent: Jan. 8, 1991

[54] METHODS FOR PREPARING A FORMED CELLULAR PLASTIC MATERIAL PATTERN EMPLOYED IN METAL CASTING

[75] Inventors: Norman G. Moll, Sanford; David R. Johnson, Midland, both of Mich.

[73] Assignee: The Dow Chemical Company, Midland, Mich.

[21] Appl. No.: 283,332

[22] Filed: Dec. 12, 1988

Related U.S. Application Data

[62] Division of Ser. No. 149,288, Jan. 28, 1988, Pat. No. 4,790,367.

[51] Int. Cl.$^5$ .............................................. C08J 9/16
[52] U.S. Cl. ........................................ 521/60; 521/56; 521/59; 521/149
[58] Field of Search .................... 521/60, 56, 59, 149

[56] References Cited

U.S. PATENT DOCUMENTS

| | | | |
|---|---|---|---|
| 3,615,972 | 10/1971 | Morehouse, Jr. et al. | 521/59 |
| 3,925,269 | 12/1975 | Miyoshi et al. | 521/60 |
| 3,960,787 | 6/1976 | Isukamoto et al. | 521/60 |
| 4,080,344 | 3/1978 | Ikeda et al. | 521/60 |
| 4,433,029 | 2/1984 | Senda et al. | 521/60 |
| 4,722,944 | 2/1988 | Mori et al. | 521/60 |
| 4,790,367 | 12/1988 | Moll et al. | 521/60 |
| 4,798,749 | 1/1989 | Arch | 521/60 |

*Primary Examiner*—Morton Foelak

[57] ABSTRACT

Expandable and expanded plastic materials having a majority of alkyl acrylate monomeric repeat units are disclosed. These materials when expanded have a volume expansion of at least 60 and maintain that volume expansion for a period of at least 30 minutes under expansion conditions after reaching the volume expansion of 60. Expandable and expanded plastic materials having a majority of alkyl acrylate monomeric repeat units and an inhibitor for the monomer(s) and a crosslinker incorporated into the plastic material upon monomer polymerization are also disclosed. Also disclosed are expandable and expanded plastic materials having majority of alkyl acrylate monomeric repeat units with blowing agents of 2,2-dimethylbutane, 2,3-dimethylbutane or mixtures of one or both with 1-chloro-1,1-difluoroethane or mixtures of at least 30 percent of one or both with other volatile blowing agents.

These specific types of formed patterns and core assemblies, wholly or partially formed from the destructible expanded closed-cell cellular plastic materials of the present invention have a decreased tendency to form nonvolatile residue during the casting of metals such as iron. Superior castings are thereby obtained without resort to unecnomic casting methods.

Further disclosed is a method of casting metal castings using the disclosed expanded plastic material articles (Lost Foam or Evaporative Pattern Casting). The disclosed expanded plastic material articles are especially preferred for metal castings having a final carbon percentage of 1.8 weight percent or less in the final casting.

35 Claims, 2 Drawing Sheets

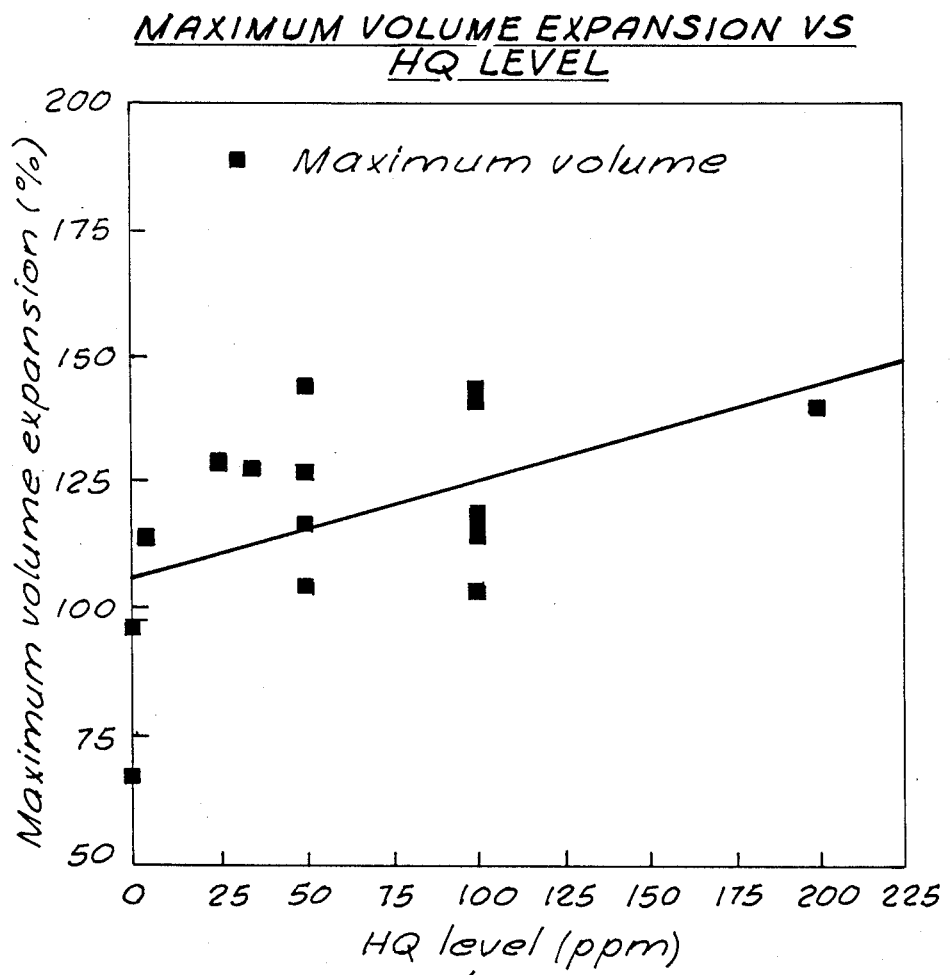

METHODS FOR PREPARING A FORMED CELLULAR PLASTIC MATERIAL PATTERN EMPLOYED IN METAL CASTING

CROSS-REFERENCE TO RELATED APPLICATIONS

This is a divisional of application Ser. No. 149,288, filed Jan. 28, 1988, now U.S. Pat. No. 4,790,367.

BACKGROUND OF THE INVENTION

1. Field of the Invention

This invention relates generally to so-called "lost foam" methods for casting metals. More specifically, it concerns methods for preparing various novel specifically defined heat-destructible shaped-foam patterns for use in replica-casting of metals (particularly low carbon steels) by the lost foam technique (particularly techniques involving "top gating"). It also concerns various novel expandable and expanded plastic materials.

Lost foam casting essentially involves pouring molten metal into a pattern having a heat-destructible portion of a cellular plastic material (or foam), while the pattern and its entry port(s), or "gate(s)", are essentially surrounded and supported by highly compacted refractory material such as sand.

2. Description of the Related Art

In the past, commercial processes have mainly involved the use of foam patterns in which the plastic material was polystyrene. However, there are problems with use of expandable polystyrene (EPS) in lost foam casting, also called evaporative pattern casting, where the pattern or core assembly is partially or wholly EPS.

One problem is that carbonaceous nonvolatile EPS residue floats on molten iron and becomes trapped inside the cavity formed by the decomposing polymeric foam. The large amount of residue results in carbon-containing voids, called carbon defects, weak points and leaks through the casting. This leads to inefficient manufacturing and component failures.

A second problem with EPS molded patterns or core assemblies is that of shrinkage. An EPS molded part with a hydrocarbon blowing agent, such as pentane, loses most of the blowing agent in a period of one month or less at room temperature Simultaneous with the loss of blowing agent, shrinkage of the molded parts occurs. This dimensional change is undesirable, especially if molded parts are to be stored for an extended period or if molded parts are to be cast during the period while shrinkage is occurring, especially if the tolerance of the cast part is critical.

Recently published Japanese Patent Disclosure Kokai No. 60-18,447 has working examples concerning the use of foam patterns prepared from polystyrene or several copolymer derived from raw materials including methyl methacrylate and alpha-methyl styrene, in casting iron and aluminum by the "bottom gate" casting technique. It also has broader general teachings. For example, it proposes that the lost foam substrate can be a homopolymer of methyl methacrylate, and that the molten metal may also be zinc, brass, or steel.

Prior art methods of lost foam casting have now been found to be inadequate and unable to prepare superior metal castings for many types of metal (such as steels having a very low carbon content) and/or many types of casting techniques (such as "top gate" techniques involving the use of downwards flow of the molten metal into the heat destructible pattern, rather than merely "bottom gate" techniques involving upwards movement of the molten metal).

BRIEF DESCRIPTION OF THE DRAWING

FIG. 2 illustrates the increasing maximum volume of expansion for expanded closed-cell cellular plastic material articles obtained when increasing amounts of an inhibitor for methyl methacrylate monomer, hydroquinone, is incorporated into the plastic material upon polymerization of the monomer with other polymerization ingredients remaining essentially constant.

SUMMARY OF THE INVENTION

Figure 1:
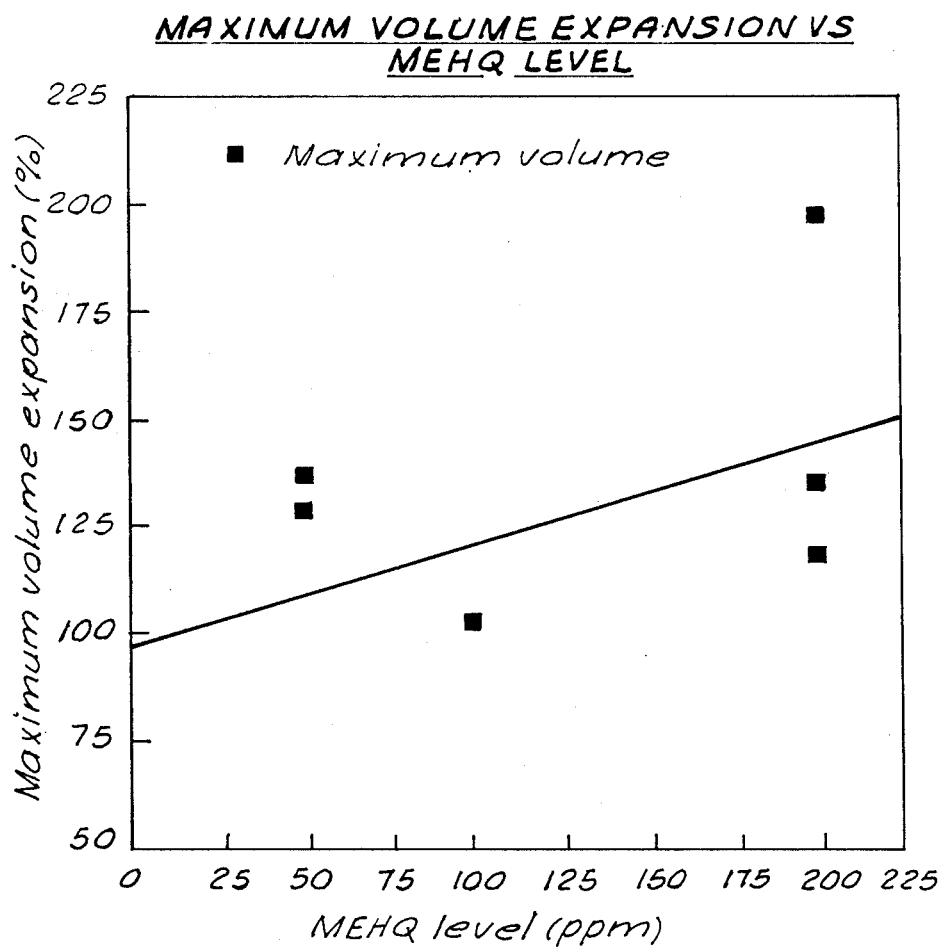
FIG. 1 illustrates the increasing maximum volume of expansion for expanded closed-cell cellular plastic material articles obtained when increasing amounts of an inhibitor for methyl methacrylate monomer, methoxyhydroquinone, is incorporated into the plastic material upon polymerization of the monomer with other polymerization ingredients remaining essentially constant.

This invention overcomes many of the deficiencies of the prior art. In one aspect, this invention relates to novel expandable and expanded plastic materials which meet certain expansion conditions or novel expandable and expanded plastic materials containing additional elements in the plastic material or specifically defined volatile blowing agents, which preferably also meet the same certain expansion conditions. In its broadest aspects, with regard to the casting of metal castings, this invention relates to the use of one or more processing conditions or limitations which have been found to be critical. These conditions (none of which are expressly or inherently disclosed by aforementioned Japanese Kokai) include, but are not limited to the following: (1) the use of an expanded (and molded) closed-cell cellular plastic material meeting certain defined expansion conditions in the casting of metal castings: (2) the use of certain types of expanded closed-cell cellular plastic materials in the casting of metal castings: (3) the casting of steel having very low carbon content; (4) the use of a "top gate"; and (5) the use of prefoamed (expanded) particles (immediately prior to being molded) which particles have a broad "molding window time range" (as defined hereinafter).

A first broad aspect of the invention are the expandable plastic material particles. Broadly, for all expandable plastic material particle embodiments, the expandable plastic material particle comprises a plastic material, polymerized from one or more monomers, containing a majority, by weight of the plastic material, of monomeric repeat units of the formula:

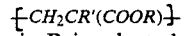

wherein R is selected from the group consisting of alkanes having 1–4 carbon atoms (C), hydroxy alkanes having 1–4 C and cycloalkanes having 3–6 C and R' is selected from the group consisting of $CH_3$ and $C_2H_5$.

In a first embodiment the expandable plastic material particle has a volatile blowing agent contained within the plastic material and the expandable plastic material particle after expansion has (i) a volume increase by a factor of at least 20 after a period of 5 minutes after the start of expansion conditions: (ii) a maximum volume expansion of at least 60: and (iii) maintains a volume expansion of at least 60 for an additional period of 30 minutes under expansion conditions after reaching the volume expansion of 60; all wherein the expansion of the expandable plastic material particle occurs at ambient pressure with hot air in an oven at a temperature of 25° C. (centigrade) above the glass transition temperature of the plastic material.

In a second embodiment the expandable plastic material particle has a volatile blowing agent contained within the plastic material, an inhibitor for the monomer(s) incorporated into the plastic material upon polymerization of the monomer(s), and a crosslinking agent incorporated into the plastic material upon polymerization of the monomer(s) to provide crosslinking of the plastic material. Although not required, preferably, this second embodiment also meets the same expansion conditions as the first embodiment.

In a third embodiment the expandable plastic material particle has a volatile blowing agent contained within the plastic material selected from the group consisting of:
(a) 2,2-dimethylbutane
(b) 2,3-dimethylbutane;
(c) 2,2-dimethylbutane and 2,3 TM dimethylbutane
(d) mixtures of (a), (b) and (c) with 1-chloro-1,1-difluoroethane; and
(e) a mixture of at least 30 percent of (a),
(b) and (c) by weight of the mixture with one or more other volatile blowing agents.

A second broad aspect of the invention are the expanded plastic material articles, of a plastic material described in the first broad aspect of the invention, which are expanded (pre-expanded, expanded or expanded and immediately or at a later time molded into a specific shape). Broadly, for all expanded plastic material article embodiments, the plastic material is the same as for the expandable plastic material particle embodiments.

In a first embodiment the expanded plastic material article has a volatile blowing agent entrapped within the plastic material and the expanded closed-cell cellular plastic material article after expansion from an expandable plastic material particle has (i) a volume increase by a factor of at least 20 after a period of 5 minutes from the start of expansion conditions; (ii) a maximum volume expansion of at least 60; and (iii) maintains a volume expansion of at least 60 for an additional period of 30 minutes under expansion conditions after reaching the volume expansion of 60: all wherein the expansion of the expandable plastic material particle article into the expanded closed-cell cellular plastic material article occurs at ambient pressure with hot air in an oven at a temperature of 25° C. above the glass transition temperature of the plastic material.

In a second embodiment the expanded plastic material article has a volatile blowing agent entrapped in the expanded closed-cell cellular plastic material, an inhibitor for the monomer(s) incorporated into the plastic material upon polymerization of the monomer(s), and a crosslinking agent incorporated into the plastic material upon polymerization of the monomer(s) to provide crosslinking of the plastic material.

In a third embodiment the expanded plastic material article has a volatile blowing agent entrapped in the expanded closed-cell cellular plastic material selected from the group consisting of:
(a) 2,2-dimethylbutane:
(b) 2,3-dimethylbutane;
(c) 2,2-dimethylbutane and 2,3-dimethylbutane
(d) mixtures of (a), (b) and (c) with 1-chloro-1,1-difluoroethane; and
(e) a mixture of at least 30 percent of (a), (b) and (c) by weight of the mixture with one or more other volatile blowing agents.

A third broad aspect of the invention is a method of replica-casting a metal casting comprising the steps of:
(a) forming a pattern having a heat-destructible portion with the heat-destructible portion being an expanded closed-cell cellular plastic material having:
(A) a plastic material, polymerized from one or more monomers, containing a majority, by weight of the plastic material, of monomeric repeat units of the formula:

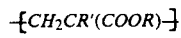

wherein R is selected from the group consisting of alkanes having 1–4 carbon atoms (C), hydroxy alkanes having 1–4 C and cycloalkanes having 3–6 C, and R' is selected from the group consisting of $CH_3$ and $C_2H_5$; and
(B) a volatile blowing agent entrapped in the expanded closed-cell cellular plastic material;
wherein the expanded closed-cell cellular plastic material article after expansion from an expandable plastic material particle has (i) a volume increase by a factor of at least 20 after a period of 5 minutes after the start of expansion conditions; (ii) a maximum volume expansion of at least 60; and (iii) maintains a volume expansion of at least 60 for an additional period of 30 minutes under expansion conditions after reaching the volume expansion of 60; all wherein the expansion of the expandable plastic material particle article into the expanded closed-cell cellular plastic material article occurs at ambient pressure with hot air in an oven at a temperature of 25° C. above the glass transition temperature of the plastic material; and
casting the metal casting with the pattern having the heat-destructible portion being the expanded closed-cell cellular plastic material.

A fourth broad aspect of the invention is a method of replica-casting a metal casting comprising the steps of:
(a) forming a pattern having a heat-destructible portion with the heat-destructible portion being an expanded closed-cell cellular plastic material having:
(A) a plastic material, polymerized from one or more monomers, containing a majority, by weight of the plastic material, of monomeric repeat units of the formula:

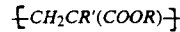

wherein R is selected from the group consisting of alkanes having 1–4 carbon atoms (C), hydroxy alkanes having 1–4 C and cycloalkanes having 3–6 C, and R' is selected from the group consisting of $CH_3$ and $C_2H_5$;
(B) a volatile blowing agent entrapped in the expanded closed-cell cellular plastic material;
(C) an inhibitor for the monomer(s) incorporated into the plastic material upon polymerization of the monomer(s): and
(D) a crosslinking agent incorporated into the plastic material upon polymerization of the monomer(s) to provide crosslinking of the plastic material; and (b) casting the metal casting with the pattern having the heat-destructible portion being the expanded closed-cell cellular plastic material.

A fifth broad aspect of the invention is a method of replica-casting a metal casting comprising the steps of:

(a) forming a pattern having a heat-destructible portion with the heat-destructible portion being an expanded closed-cell cellular plastic material having:

(A) a plastic material, polymerized from one or more monomers, containing a majority, by weight of the plastic material, of monomeric repeat units of the formula:

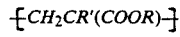

wherein R is selected from the group consisting of alkanes having 1–4 carbon atoms (C), hydroxy alkanes having 1–4 C and cycloalkanes having 3–6 C, and R' is selected from the group consisting of $CH_3$ and $C_2H_5$;

(B) a volatile blowing agent entrapped in the expanded closed-cell cellular plastic material; and ((b) casting the metal casting with the pattern having the heat-destructible portion being the expanded closed-cell cellular plastic material and with a metal selected from the group consisting of:

(1) an iron base alloy;
(2) a steel;
(3) a stainless steel; and
(4) a stainless steel alloy;

so that the metal casting, after casting, has a carbon percentage of less than about 1.8 weight percent based on metal weight.

Preferably those expandable and expanded plastic materials containing an average total aromatic component within the plastic materials' molecules of less than 3 weight percent based on the total weight of plastic material are used in the casting of metal casting so as to minimize carbon formation.

The technical advantages of this invention are illustrated by the discussion below and a comparison of the Examples and Comparative Examples hereinafter.

DETAILED DESCRIPTION

The ability to make expandable and expanded plastic materials having a low density and certain physical properties, such as dimensional stability, is critical in certain foam applications. The expandable and expanded plastic materials of the present invention, while doubtlessly useful in other applications, are specifically useful in the area of metal casting of replicas, often called "lost foam casting" or "evaporative pattern casting."

The ability to produce defect-free castings using a top gated pattern in a multi-pattern cluster is a major advantage of this invention. While bottom gating, side gating, and combinations of top, bottom and side gating may also be useful in certain circumstances, the use of top gating has the following four major advantages.

1. Better handling of clusters in the dipping, drying and flask loading steps.

2. Less breakage during sand compaction as a result of sand pressure of the gate area where the foam cross section is typically small. (During compaction sand flow is frequently down the flask walls, across the bottom and up the center. Bottom gated patterns situated near the bottom of the flask are thus subject to considerable pressure during this step which, if too severe, may break the pattern connection to the cluster at the gate. With top gating the cluster may move at the bottom slightly without concern for breakage.)

3. Since the sprue is shorter the metal yield (of useful cast metal from molten metal) is correspondingly higher.

4. Risers, if needed, are filled with hotter metal and thus can be designed smaller, again resulting in a higher metal yield.

It should be noted that, firstly, with pattern materials prone to generating carbon residues, bottom gating results in the defects occurring on the upper surfaces of the casting. Top gating on the other hand has been found to create a tendency to cause carbon defects to occur "within" the casting as opposed to on its upper surface. This poses a serious problem for parts used under stress where internal carbon defects may function as stress raisers in the final part leading to mechanical failure. Elimination of internal carbon defects is thus an essential key to being able to cast parts with top gating, and an unexpected advantage of this invention.

Secondly, casting trials have generally shown that top gating places "more severe demands" on the foam pattern than bottom gating. This is because in the final phases of metal filling the foam adjacent to the gate (which is the last to be displaced by molten metal) has a tendency to collapse before filling with the metal is complete. This type of failure is clearly serious because the resulting castings fail to completely replicate the pattern.

We have now found, very surprisingly, that the tendency for foam collapse to occur during metal casting of top gated patterns is strongly correlated with the moldability of the pre-foamed resin as determined by the size of the "molding window" obtained in standard test procedures described hereinafter.

We have also now found, very surprisingly, that the tendency for foam collapse to occur during metal casting is strongly correlated with the expansion characteristics of the expandable and expanded plastic materials as determined by the "volume expansion" obtained in standard test procedures described hereinafter. Expandable and expanded plastic materials having the required expansion characteristics will also have the necessary molding window time range for the pre-foamed beads (or particles). Although not all the embodiments of the expandable particle and expanded article embodiments and processes employing the expanded articles in the present invention require the defined expansion characteristics, it is preferable that all embodiments meet the required expansion characteristics.

Even with the benefit of hindsight it is still not clear as to why either the volume expansion range of the expandable and expanded plastic materials or the molding window time range of the pre-foamed beads is critically important (over and above the requirement that the shape of the molded pattern conform to the shape of the metal item that is to be cast). However, the discussion below is now given as a partial and hindsight explanation of our surprising finding.

Firstly, for a resin to be successfully molded it must expand rapidly when heated to a temperature above the glass transition temperature. Since diffusion of volatile blowing agent is accelerated during heating, the retention of volatile blowing agent during pre-expansion and molding is a critical factor in determining the minimum density at which the resin can be molded. The measurement of volatile blowing agent retention following heating to a temperature typical of that used in pre-expansion is thus a useful index of the resins expected performance in molding.

Two major factors control the rate of blowing agent loss from the poly(methyl methacrylate) (PMMA) resins used in our invention at temperatures above the glass transition temperature.

1. The barrier properties of the polymer, and
2. The uniformity of the nucleation of the resin.

"Barrier properties" of the resin during expansion are highly dependent on the molecular weight distribution of the polymer. According to the present invention the optimum molecular weight distribution appears to be obtained in the polymer when a level of crosslinking corresponding to one crosslink per weight average molecular chain is incorporated. The resulting molecular weight distribution is then very broad, including some network polymer which is insoluble in solvents which will dissolve the uncrosslinked polymer. Ideally the soluble portion of the crosslinked resin will have an apparent weight average molecular weight of about 270,000±50,000. Poly-dispersity is the weight-average molecular weight of the material divided by the number-average molecular weight of the material. The poly-dispersity of the material should be 2.7 or greater. Any uncrosslinked resin should also meet this apparent weight average molecular weight limitation and preferably also the poly-dispersity limitation.

"Uniformity of nucleation" is also important. If the pre-expanded bead has a uniformly fine cell structure consisting of cells with diameters from 30 to 180 microns when the absolute density (as opposed to bulk density) of the beads is about 1.5 pounds per cubic foot, optimum retention of blowing agent will be achieved provided the polymer in the foam has acceptable barrier properties. In some circumstances, if for example the amount of blowing agent added to the monomer mixture is excessive, extensive phase separation of the blowing agent from the polymer may occur in the late stages of polymerization rather than during quenching at the end of the reaction. Since the polymer is still soft at the former stage the blowing agent which phase separates can diffuse readily and collect in pools much larger than the microscopic nucleation sites which are formed during normal quenching. During expansion, each of these large pools of blowing agent becomes a discrete cell. In the "prefoamed" state these large cells make the foam particles vulnerable to damage and resultant loss of blowing agent.

In the process of molding, as described elsewhere, pre-expanded beads are placed in the mold cavity of a steam jacketed, vented mold tool. During steaming the beads expand a second time, collapsing the voids between the originally spherical foam beads. The pressure exerted by the foam is contained by the pressure on the tool and leads to inter-particle fusion. If the steaming time of the mold cycle is too short, fusion is incomplete, the part is heavy from water remaining in the voids, and mechanical properties of the foam will be poor. If the steaming time is excessive the foam pattern will lose some of its blowing agent and the pattern will shrink back from the walls of the mold cavity. If the density is not too low, between these two times there will be a time range sufficient to provide acceptable quality, well-fused, full-side patterns. If one attempts to mold a resin at too low a density, shrink-back will occur before fusion has been completed. In this case there will be no combination of time and temperature (steam pressure) which will yield an acceptable pattern, that is, a molding window does not exist.

The molding window for a given density for a given pattern represents the combination of times and temperatures (steam pressures) which yield acceptable molded parts. Since the size of the molding window is a function of the barrier properties of the polymer as well as the character of the nucleation, the size of the molding window provides an index to the moldability of the resin. In general an excellent correlation may be obtained between the size of the molding window and the bead expansion vs time and blowing agent retention vs time both at a temperature of 25° C. above the glass transition temperature of the plastic material. Resins which (1) expand slowly, (2) fail to reach a high volume ratio, (3) expand rapidly and then suddenly collapse, or (4) exhibit rapid loss of blowing agent also tend to have a small molding window at useful densities. Molding window plots for many resin formulations were determined. Many of these resin formulations were further evaluated in casting trials.

From the molding windows trials and corresponding casting trials, it was concluded that the foamable beads used in step (2) of the invention preferably have (i) a volume increase by a factor of at least 20 after a period of 5 minutes from the start of expansion conditions; 1 (ii) a maximum volume expansion of at least 60; and (iii) maintain a volume expansion of at least 60 for an additional period of 30 minutes under expansion conditions after reaching the volume expansion of 60; all wherein the expansion of the expandable plastic material particle occurs at ambient pressure with hot air in an oven at a temperature of 25° C. above the glass transition temperature of the plastic material.

The following test method was used to determine the "volume increase after 5 minutes from the start of expansion conditions", "maximum volume expansion" and "maintain a volume expansion of at least 60 for an additional period of 30 minutes under expansion conditions after reaching the volume expansion of 60". A sample of expandable particles having a weight of about 0.5 gram is placed in a 1 gram aluminum weighing dish. The dish containing the sample is then placed in the preheated forced circulation oven at the predetermined temperature and ambient pressure for the predetermined time. The hot air is mildly-circulated, to obtain isothermal conditions, through the oven at a rate well below that at which fluidization of the foamed beads (expanded articles) would occur. It should be noted that a separate sample is required for each individual interval time in the expansion test. Volume expansion is the ratio of the specific volume of the foamed beads (expanded articles) divided by the specific volume of the unfoamed beads (expandable particles). The specific volume of the beads (either foamed or unfoamed) is determined by conventional liquid displacement tests, with the foamed beads being cooled back to room temperature after expansion. The specific volume of the beads (either foamed or unfoamed) can also be obtained by weighing in air a known volume of the beads and correcting for the void volume. The volume expansion and maximum volume expansion is then determined from the individual volume expansions performed at a constant temperature (for example, 130° C. for typical PMMA resins having a glass transition temperature of about 105° C.) at different time intervals. One example of a series of time intervals might include, 2, 5, 10, 20, 30, 40, 60, 80, 100, and 120 minutes in the hot air oven.

Examples Concerning the Correlation Between Volume Expansion and Molding Window Time Range Table 1 illustrates the correlation between the required volume expansion characteristics of (i) a volume increase by a factor of at least 20 after a period of 5 minutes from the start of expansion conditions; (ii) a maximum volume expansion of at least 60; and (iii) maintain a volume expansion of at least 60 for an additional period of 30 minutes under expansion conditions after reaching the volume expansion of 60 and the molding window time range for four different PMMA resins.

TABLE 1

| Resin | Characteristics of the Expanded Beads | | | |
|---|---|---|---|---|
| | A | B | C | D |
| Volume Expansion | | | | |
| 5 Minutes | 37.50 | 26.49 | 42.92 | 42.03 |
| 10 Minutes | 66.76 | 41.94 | 78.48 | 73.17 |
| 20 Minutes | 116.45 | 70.36 | 118.05 | 97.01 |
| 40 Minutes | 138.49 | 80.76 | 135.90 | 105.87 |
| 60 Minutes | 147.88 | 92.60 | 122.95 | 77.12 |
| 80 Minutes | 201.01 | 100.38 | 38.56 | 35.71 |
| Molding Window* | 42 | 31 | 44 | 42 |
| Density, pcf** | 1.60 | 1.60 | 1.60 | 1.60 |
| Blowing*** Agent | 113 | Neo-hexane/142b | Neo-hexane | 2,3-dimethyl butane |

*Molding window time range determined at 20 psig steam, time in seconds.
**Density of pre-expanded resin used in molding window determination.
***"113" denotes the DuPont Freon ® 113 ® or 1,1,2-trichloro-1,2,2-trifluoroethane; Neo-hexane denotes 2,2-dimethylbutane and "142b" denotes 1,chloro-1,1-difluoroethane.

Examples Concerning the Effect of Molding Window Time Range

Tables 1A and 1B taken together provide one example of the correlation between molding window time range (Table 1A) and the casting performance (Table 1B) of top gated patterns having graduated "ease of casting." The molding window time range is determined for six different PMMA resins using a vented, block mold with part dimensions of 2" deep×8" high×8" wide. The mold is mounted on mold press with a vertical parting line. The tool (mold) is vented on the two 8"×8" faces with a square array of vents on 1 1 3/16" centers, 49 vents per side. With the exception of Resin #2 all of these materials have, in other tests, shown acceptable performance in bottom gated casting configurations. The metal poured is ductile iron. Shape A (in Table 1B) is the least difficult shape to cast, and Shape D is the most difficult.

TABLE 1A

| | Prefoamed Beads Used to Prepare Pattern | | | | | |
|---|---|---|---|---|---|---|
| Resin # | 1 | 2 | 3 | 4 | 5 | 6 |
| Molding Window* | 11 | 2 | 15 | 18 | 18 | 14 |
| Density, pcf** | 1.50 | 1.50 | 1.38 | 1.57 | 1.48 | 1.60 |
| Cell Size | Medium Fine | Large & Small | Fine | Large & Small | Fine | Medium Fine |
| Blowing*** Agent | 113/114 | 113/114 | 113 | 113/114 | 113 | 113/114 |

*Molding window time range determined at 20 psig steam, time in seconds.
**Density of pre-expanded resin used in molding window determination.
***"113" denotes the Dupont Freon ® 113 ® or 1,1,2-trichloro-1,2,2-trifluoroethane; and "114" denotes the DuPont Freon ® 114 or 1,2-dichloro-1,1,2,2-tetrafluoroethane.

TABLE 1B

| | Casting Results**** | | | | | |
|---|---|---|---|---|---|---|
| Shape A | Fair | Poor | Good | V Good | V Good | V Good |
| Shape B | Poor | Poor | Fair | Good | — | V Good |
| Shape C | — | — | Good | Good | Good | V Good |
| Shape D | Poor | Poor | Poor | Poor | — | V Good |

****Casting results: In all cases the ductile iron castings show no surface defects due to lustrous carbon. The gradation of performance of the resin indicated relates to the tendency for the foam to collapse during the pouring of the patterns in a top gated configuration. Casting Shapes A to D have the following configurations..
A. 11.5" diameter flange with open cylinders 7.5" and 3.5" O.D. attached to opposite sides.
B. Same as A but all diameters increased about 30%
C. 18" diameter flange with hemispherical cap, having a 7.5 inch radius of curvature, on one face and support posts on the other.
D. 8.5" OD × 6.12" ID open cylinder attached to a 14" × 1.44" flange.

Surprisingly, an expanded closed-cell cellular plastic material having a majority of monomeric repeat units of the formula:

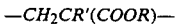

$$-CH_2CR'(COOR)-$$

having (i) a volume increase by a factor of at least 20 after a period of 5 minutes from the start of expansion conditions; (ii) a maximum volume expansion of at least 60; and (iii) maintaining a volume expansion of at least 60 for an additional period of 30 minutes under expansion conditions after reaching the volume expansion of 60; all wherein the expansion of the expandable plastic material particle article occurs at ambient pressure with hot air in an oven at a temperature of 25° C. above the glass transition temperature of the plastic material in all broad aspects of the invention yields less nonvolatile carbonaceous residue than expected. Even more surprisingly, the use of a cellular plastic material of poly(methyl methacrylate), one embodiment of this formula, in lost foam casting, results in the nearly total absence of the defect-causing nonvolatile carbonaceous residue.

This absence or near absence of carbonaceous residue and the resulting casting defects allows the use of cellular plastic material patterns with higher densities Increased density affects the patterns' compressive strength, surface hardness, and stiffness. This increased density translates directly into improved casting tolerances and less stringent handling requirements especially in the sand filling and compaction steps.

This absence or near absence of residue also allows the casting of low carbon steel, stainless steel and alloys of these steels due to a decrease in carbon pickup from the molded cellular plastic material patterns into a molten metal. An excessive carbon pickup will result in a loss of corrosion resistance in stainless steel and a loss of physical strength in low carbon high alloy steels. These expanded closed-cell cellular plastic material articles are especially useful in the casting of those metals which after casting require a carbon percentage in the metal casting of about 1 8 weight percent or less.

When casting aluminum, defects due to polymeric residues, while not visually observable, are detectable at folds and fronts where molten aluminum coming from different directions meet. The defect, in this case, is a thin layer of polymeric residue which reduces the cast part's integrity by causing weak points and leaks at the folds and fronts.

Thus, due to the nearly total absence of non-volatile carbonaceous residue, the cellular plastic materials of the present invention are useful in the preparation of patterns wholly or partially composed of a destructible portion, which are used in metal casting. These cellular plastic materials may be polymers, copolymers or interpolymers having repeat units of the aforementioned formula and preferably after forming have a formed density of 0.7 to 5.0 pounds per cubic foot.

Pyrolysis Screening Trials

Various preliminary screening trials are performed. In particular, certain plastic materials, based on pyrolysis temperatures which approximates actual casting conditions, but absence the presence of a blowing agent, have now been tested and shown to have reduced amounts of carbonaceous nonvolatile residue. These plastic materials include styrene/acrylonitrile copolymers, poly(alpha-methylstyrene), poly(methyl methacrylate), poly(1-butene/$SO_2$), and poly(acetal), as discussed below. Poly(alkylene carbonates) may also have a reduced amount of carbonaceous nonvolatile residue, but these resins were not tested.

To obtain an indication of the amount of carbonaceous nonvolatile residue present for a given material, a technique was adapted from rapid pyrolysis analysis methodology used to study the decomposition of polymeric materials.

The method uses a weighed sample of about 1 milligram of the polymer to be tested. The sample is placed in a quartz capillary. The capillary is installed in a platinum coil contained in a sample chamber. The sample is pyrolyzed by passing a current through the platinum coil. Pyrolysis gases are trapped in a gas chromatograph column for later separation and identification by rapid scan mass spectrometry. Following pyrolysis, the residue remaining in the quartz capillary is weighed to determine the weight percent residue yield.

Table 2A indicates pyrolysis residue yields at two different pyrolysis conditions as shown in Table 2B. The second column of pyrolysis conditions with an approximately 700° C. temperature rise per second is believed to more closely approximate metal casting conditions.

Decreased amounts of residue are necessary for those cast metals having a low carbon specification. This specification is found for some grades of stainless steel. Those polymers having low residue may be useful in the casting of such grades of stainless steel.

It is believed that the type of monomer(s) and desired polymer(s) have an affect on the tendency for carbon formation to occur during the pouring of ferrous castings.

TABLE 2A

| | % Residue | |
|---|---|---|
| Polymer | Condition 1 | Condition 2 |
| Poly(Acetal) | 0.5 | |
| Poly(methyl methacrylate) | 0.8 | 3.2 |
| Poly(1-butene/$SO_2$) | | 3.8 |
| Poly(alpha-methylstyrene) | 2.2 | |
| Lightly crosslinked expandable polystyrene | 6.2 | 15.1 |
| Ethylene/acrylic acid copolymer | 8.6 | |

TABLE 2A-continued

| | % Residue | |
|---|---|---|
| Polymer | Condition 1 | Condition 2 |
| Styrene/acrylonitrile copolymer with 1,1,2-trichloro-1,2,2-trifluoroethane | 9.8 | 11.55 |
| Poly(ethylene terphthalate) | 11.0 | |
| Polycarbonate | 26.4 | 52.8 |

TABLE 2B

| PYROLYSIS CONDITIONS | | |
|---|---|---|
| | Condition 1 | Condition 2 |
| Heating Rate | 1° C. sec | 700° C./sec |
| Maximum Temperature | 1400° C. | 1400° C. |
| Hold at Maximum Temperature | 6.7 min | 18 sec |
| Atmosphere | Air | Nitrogen |
| Flow During Pyrolysis | None | None |
| Pretreatment Temperature | 50° C. | 50° C. |
| Capillary Tube Configuration | Open tube | Inlet end closed |

The formation of carbon during the pyrolysis of polymers is largely a kineticly controlled phenomena. Polymer decomposition via unzipping as is believed to occur in methyl- and ethyl-methacrylate as well as in alpha-methyl styrene, results in a very rapid lowering of the average molecular weight of the polymer. The low molecular weight fragments which are formed are highly volatile, and if a liquid, have a very low viscosity. Their escape from the pattern region is thus rapid compared to the rate of escape of the much larger polymer fragments formed by the random cleavage mechanism. Thus PMMA and PMMA/alphamethylstyrene (AMS) copolymers are expected to exhibit lower carbon formations than polystyrene on pyrolysis at 1400 degrees C. Another factor that enters into consideration is the propensity of the monomer molecules to form carbon. In this regard, molecules containing an aromatic group are generally more prone to carbon formation than those without. Oxygen in the molecule also serves to reduce to carbon yield by tying up carbon in the decomposition products as CO or $CO_2$. These trends are seen clearly in the residue yields reported in Table 2A.

These considerations lead us to conclude that PMMA containing less than 3% of aromatic-group-containing monomer units will yield a lower amount of carbon residue than the PMMA/AMS copolymers prepared in the working Examples of the aforementioned Japanese Kokai. Thus a preferred composition is PMMA not containing AMS.

Preferably, the cellular plastic materials have a majority of repeat units of methyl methacrylate:

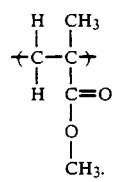

Most preferably, the cellular plastic material is composed of at least 70 percent by weight of methyl methacrylate repeat units, excluding any volatile blowing agent.

Cellular plastic materials to be used for lost foam casting suitably have a glass-transition temperature within the range of 60° C. to 140° C. Preferably, the glass-transition temperature is about 100° C. The R group must not include aromatic nuclei, such as, for example, phenyl, naphthyl, or toluoyl, because these typically yield carbonaceous residue. The R group also must not include groups prone to ring closure during heating, such as, for example, —C≡N and —N=C=O which also yield carbonaceous material.

Other copolymerizable monomers include other acrylates, preferably alkyl acrylates, acrylic acids, preferably alkyl acrylic acids, alpha-methylstyrene, and any other known copolymerizable monomers, especially those that are copolymerizable with PMMA and do not themselves or in the polymer combination with methyl methacrylate cause excessive carbon residue.

Generally, it is preferred that the plastic material contains an average total aromatic content within the plastic's molecules of less than 3 weight percent based on the total weight of plastic material.

The words "plastic material" as used in regards to the present invention are defined to be those plastic materials of the specified formula in the present invention which are thermoplastic. The words "expandable plastic material particles" as used in regards to the present invention include expandable particles, beads or other shapes which are expandable and generally used for molding purposes. Preferably the expandable particles provide expanded article of a relatively small size, so when the expanded articles are molded and used for lost foam casting the molded expanded article has a smooth surface. The words "expanded plastic material articles" as used in regards to the present invention include those articles which are foamed (expanded), pre-foamed, foamed and molded, pre-foamed and molded and molded items which are prepared from foamed or pre-foamed expandable plastic material articles.

Examples Concerning Aromatic Content of Foam

A casting similar to that designated as "Shape A" in Table 1B above is poured with ductile iron using a top gated sprue system. The pattern is prepared using a 50:50 mixture of expanded polystyrene and PMMA pre-expanded beads. Compared to a PMMA pattern of similar density, the polystyrene-containing pattern when poured produced a casting with an unacceptably high level of carbon defects.

In a comparative experiment a 2"×8"×8" block of foam with a density of about 1.5 pcf consisting of a copolymer prepared from a monomer mixture containing 30 parts of styrene and 70 parts of methyl methacrylate is poured with ductile iron. The block is oriented horizontally and gated along the bottom edge. The resulting casting showed a moderate level of carbon defects on the upper horizontal surface compared to virtually no carbon defects on a PMMA block gated and cast in the same manner.

From discussions with foundrymen and literature references it is known that expandable polystyrene (EPS) when used as a pattern material in steel castings, results in carbon pickup of from 0.15% to greater than 0.5%. With EPS patterns the carbon frequently occurs in segregated locations causing a localized failure to meet composition and performance specifications. In addition to carbon pickup, lustrous carbon defects and carbon occlusions are sometimes observed in steel castings made with EPS patterns.

By analogy with the ductile iron results described for 50:50 and 30:70 polystyrene/PMMA systems, lower aromatic contents are expected to reduce but not eliminate the problem of carbon pickup in low carbon steel alloys. The examples below relating to the pouring of PMMA patterns with steel confirm that carbon pickup can reach an acceptably low level when the aromatic content of the monomer is essentially zero. While a low carbon residue is preferred and required for some metal casting applications, for other metal casting applications it may be possible to tolerate an expanded plastic material pattern having greater carbon residue.

EXAMPLES OF STEEL CASTINGS MADE WITH PMMA FOAM PATTERNS

Steel is commonly defined as an iron base alloy, malleable under proper conditions, containing up to 2 percent by weight of carbon (see McGraw Hill's "Dictionary of Scientific Terms," Third Edition, 1984). There are two main types of steel—"carbon steels" and "alloy steels." According to a British Alloy Steels Research Committee definition "Carbon steels are regarded as steel containing not more than 1.5 weight percent manganese and 0.5 weight percent silicon, all other steels being regarded as alloy steels ". Alloy steels may be divided into four end use classes: (1) stainless and heat resisting steels: (2) structural steels (which are subjected to stresses in machine parts); (3) tool and die steels: and, (4) magnetic alloys.

Step casting patterns are assembled from pieces cut from 2"×8"×8" PMMA foam blocks. Densities of the foam patterns are 1.1, 1.5, and 1.9 pcf. A martensitic stainless steel with a base carbon content of 0.05% was poured at a temperature of about 2900 degrees F. (1580 degrees C.). Hot melt glue is used to assemble the foam step-blocks. The blocks are packed in a bonded sodium silicate sand. Carbon pickup at 0.01" and 0.02" depths into the upper surfaces of the first and second steps of the casting amounted to 0 01 to 0.06% net at all three densities. At the third step (top of the 6" thick section) carbon levels ranged from 0.12 to 0.19% representing a carbon pickup of from 0.07 to 0.14%. The sectioned castings after etching showed no signs of carbon segregation.

Another step block is poured with a high strength, low alloy steel, (nominally 1% Ni, 0.75% Cr, and 0.5% Mo) with a base carbon content of 0.16%. A rubber cement is used to bond the foam pieces into the step block configuration. Foam density is 1.5 pcf.

Carbon levels in samples milled from "cope" surfaces ranged from 0.01 to 0.22%. On the first and second steps carbon levels were 0.08 to 0.14%.

Based on these results it is concluded that PMMA can be used as pattern material with low alloy steel without detrimental carbon pickup.

Top gating of patterns to be poured with steel is expected to require highly collapse resistant foam as in the case of ductile iron poured with top gating.

Acceptable volatile blowing agents must have a sufficient molecular size to be retained in the unexpanded bead as well as adequate volatility to cause the beads to expand at a temperature in the range of 75° C. to 150° C., preferably between 100° C. and 125° C. The solubility parameter of the volatile blowing agent should preferably be about two units less than the solubility parameter of the polymer to assure nucleation of a fine-cell cellular plastic material.

While it may be possible to use a volatile blowing agent that is a chemical blowing agent, it is preferred to use a volatile blowing agent that is a physical blowing agent. A wide variety of volatile fluid blowing agents may be employed to form the cellular plastic material. These include chlorofluorocarbons and volatile aliphatic hydrocarbons. Some considerations exist though and include the potential of fire hazard, and the loss of blowing agent over time, which may cause dimensional stability problems. For these reasons, chlorofluorocarbons are usually preferred. Some of these chlorofluorocarbons include, by way of example and not limitation, trichlorofluoromethane, dichlorodifluoro-methane, 1,1,2-trichloro-1,2,2-trifluoroethane and 1,2-dichloro-1,1,2 2-tetrafluoroethane and mixtures of these fluorochlorocarbons.

The preferred volatile blowing agents are
(a) 1,1,2-trichloro-1,2,2-trifluoroethane;
(b) a mixture having at least 20 weight percent of 1,1,2-trichloro-1,2,2-trifluoroethane by weight of the mixture, with the remainder of the mixture selected from the group consisting of:
(1) 1,2-dichloro-1,1,2,2-tetrafluoroethane: and
(2) one or more other volatile blowing agents;
(c) 2,2-dimethylbutane: (also called neo-hexane)
(d) 2,3-dimethylbutane:
(e) a mixture of 2,2-dimethylbutane and 2,3-dimethylbutane;
(f) a mixture of (c), (d) and (e) with 1-chloro-1,1-difluoroethane: and
(g) a mixture of at least 30 weight percent of (c), (d) or (e) by weight of the mixture with one or more other volatile blowing agents.

Most preferred are 1,1,2-trichloro-1,2,2trifluoroethane, a mixture of 1,1,2-trichloro-1,2,2-trifluoroethane and 1,2-dichloro-1,1,2,2-tetrafluoroethane preferably present in an amount of 40 to 50 weight percent 1,1,2-trichloro-1,2,2-trifluoroethane and 50 to 60 weight percent 1,2-dichloro-1,1,2,2-tetrafluoroethane by mixture weight, neo-hexane, neo-hexane and 1-chloro-1,1-difluoroethane preferably with neo-hexane present at least 30 weight percent by weight of the mixture and a mixture of neo-hexane and 2,3-dimethylbutane. The neo-hexane and or 2,3-dimethylbutane used as a blowing agent is generally obtained as a mixed hexane isomer mixture with the majority by weight of the mixture being neo-hexane and/or 2,3-dimethylbutane. Preferably the mixed hexane isomer mixture about at least 75 percent by weight neo-hexane and/or 2,3-dimethylbutane. A proper amount of the mixed hexane isomer mixture, when used as a volatile blowing agent in a mixture with other volatile blowing agents should be added to provide the required level of neo-hexane and-/or 2,3-dimethylbutane.

Preferably, the volatile blowing agent contained within the expandable plastic material particle is present in an amount of from about 0.09 moles to about 0.21 moles of blowing agent per mole of polymerized monomer, more preferably an amount of from about 0.15 moles to about 0.19 moles of blowing agent per mole of polymerized monomer with the preferred monomer being methyl methacrylate. Preferably, the volatile blowing agent contained within the expanded plastic material is present in an amount of from about 0.06 moles to about 0.18 moles of blowing agent per mole of polymerized monomer with the preferred monomer being methyl methacrylate.

The density of the formed destructible portion of the pattern after forming is generally in the range of 0.7 to 5.0 pounds per cubic foot. Preferably, the density is in the range of 1.0 to 2.2 pounds per cubic foot.

The use of a crosslinking agent in the preparation of the plastic material is preferable, but not required, except where stated in the claims.

These crosslinking agents may include, by way of example and not limitation, divinyl benzene, ethylene glycol dimethacrylate and diethylene glycol dimethacrylate. The crosslinking agent is present, prior to incorporation into the plastic material in an amount of from about $1.5 \times 10^{-4}$ to about $6.2 \times 10^{-4}$ moles of crosslinking agent per mole of the monomer(s) preferably in an amount of from about $3.1 \times 10^{-4}$ to about $4.6 \times 10^{-4}$ moles of crosslinking agent per mole of the monomer(s). The preferred crosslinking agent is divinyl benzene.

Preferably there are about 0.5 difunctional crosslinking agent molecules per weight average polymer chain.

The use of a crosslinking agent improves the molding characteristics of the cellular plastic material by reducing blowing agent diffusion and loss at molding temperatures, thus rendering the cellular plastic material less susceptible to premature collapse.

While the use of a crosslinking agent may reduce cellular plastic material expansion rate, this decrease in expansion rate may be partially or wholly offset by decreasing the base molecular weight of the plastic material. This base molecular weight is the molecular weight which would be normally obtained in the absence of a crosslinking agent.

In a second embodiment, of the present invention, it has been found that the combined use of a crosslinking agent and an inhibitor for the monomer, both incorporated into the plastic material upon polymerization, provides an increasing volume expansion, at a constant crosslinking agent level with an increasing amount of inhibitor.

FIG. 1 illustrates the increasing maximum volume expansion obtained with an increasing inhibitor level of methoxyhydroquinone (MEHQ) for methyl methacrylate monomer with other polymerization ingredients remaining essentially constant.

FIG. 2 illustrates the increasing maximum volume expansion obtained with an increasing inhibitor level of hydroquinone (HQ) for methyl methacrylate monomer with other polymerization ingredients remaining essentially constant.

Table A contains approximate basic formulation and process information for FIGS. 1 and 2.

TABLE A

| Formulation and Conditions | |
|---|---|
| Water, g (grams) | 3152 |
| Methyl Methacrylate, g | 2405 |
| 1,1,2-trichloro-1,2,2-trifluoroethane, g (F-113) | 1063 |
| Carboxymethyl methylcellulose, g | 16.71 |
| $K_2Cr_2O_7$, g | 3.79 |
| t-Butyl-Peroctoate, (50% active) g | 5.51 |
| t-Butyl-Perbenzoate, g | 4.69 |
| Name of chain transfer agent | $CBr_4$[1] |
| Weight of chain transfer agent, g | 11.34 |
| Divinyl benzene, (55% active) g | 1.76 |
| Inhibitor, parts per million (MEHQ & HQ) | varies |
| Revolutions per Minute for agitator | approx. 134 |
| $M_w$[2] | 270,000 +/− 50,000 |
| $M_w/M_n$[3] | greater |

TABLE A-continued
Formulation and Conditions than
2.7

(1) Carbon tetrabromide
(2) Weight-average molecular weight
(3) Weight-average molecular weight/number average molecular weight The inhibitor is present, prior to incorporation into the plastic material, at a level of about at least 25 parts by weight per million parts by weight of the monomer(s), preferably at a level of about at least 50 parts by weight per million parts by weight of the monomer(s).

When using the preferred methyl methacrylate monomer, the preferred inhibitors are hydroquinone and methylhydroquinone or mixtures of both, with hydroquinone being the most preferred.

The use of a suspending agent and one or more initiators is also required in the preparation of the plastic material.

The suspending agents may include, by way of example and not limitation, methyl cellulose, polyvinyl alcohol, carboxymethyl methyl cellulose and gelatin.

The initiator may be one or more peroxides which are known to act as free radical initiators.

The initiators may include, by way of example and not limitation, ammonium, sodium and potassium persulfates, hydrogen peroxide, perborates or percarbonates of sodium or potassium, benzoyl peroxide, tert-butyl hydroperoxide, tert-butyl peroctoate, cumene peroxide, tetralin peroxide, acetyl peroxide, caproyl peroxide, tert-butyl perbenzoate, tert-butyl diperphthalate and methyl ethyl ketone peroxide.

The use of a chain transfer agent in the preparation of the plastic material is also preferable, but not required. These chain transfer agents may include, by way of example and not limitation, isooctyl thioglycoate (IOTG) and carbon tetrabromide. Preferably the chain transfer agent is carbon tetrabromide ($CBr_4$).

When using the preferred methyl methacrylate monomer the preferred chain transfer agent, carbon tetrabromide, is present, prior to incorporation into the plastic material, in an amount of from about $2.51 \times 10^{-4}$ to about $20.10 \times 10^{-4}$ moles of chain transfer agent per mole of (methyl methacrylate) monomer, preferably, in an amount of from about $5.02 \times 10^{-4}$ to about $20.10 \times 10^{-4}$ moles of chain transfer agent per mole of (methyl methacrylate) monomer.

The use of a chain transfer agent in the preparation of the plastic material in combination with the initiator allows the polymer molecular weight to be controlled independently of the rate of heat generation in the polymerization. The chain transfer agent reacts with the growing polymer chain end, terminating the chain growth but also initiating the growth of a new chain.

A chain transfer agent is thus valuable in highly exothermic polymerizations, since it allows initiator levels to be changed while still obtaining the desired molecular weight through an opposite change in the amount of chain transfer agent used.

For example, in a system with $CBr_4$ as a chain transfer agent and tert-butyl peroctoate (t-BPO) as an initiator, a two-fold decrease in t-BPO requires an approximately 20 percent increase in the $CBr_4$ chain transfer agent level to maintain about the same molecular weight.

On scaling a reaction from a smaller to larger reactor, it has been found that initiator levels may need to be lowered to avoid an excessive temperature differential between the reaction mixture and the vessel cooling system.

The following weight percents of materials yield resins with molecular weights in the range where expansion rate, time to foam collapse, and ultimate expansion are all excellent.

| Number of Experiment | Weight Percent Based on MMA Monomer | |
|---|---|---|
| | $CBr_4$ | t-BPO |
| 1 | .41 | .70 |
| 2 | .47 | .23 |
| 3 | .50 | .11 |

In addition to the benefits described above, resins made with a $CBr_4$ chain transfer agent have a lower temperature at which thermal degradation begins than resins made with IOTG chain transfer agent or chain transfer agents of lesser activity.

The general process steps for obtaining a cast metal part utilizing a pattern with a molded destructible portion are the following:

(A) Prepare the Plastic Material: The formulations are prepared in a one gallon reactor having agitation. Aqueous and organic phase mixtures are prepared. The aqueous phase having water, carboxymethyl methyl cellulose (CMMC), and potassium dichromate ($K_2Cr_2O_7$) is prepared in a one gallon wide mouth bottle and is transferred to the reactor by vacuum. The organic phase mixture, having monomer, initiator, chain transfer agent and blowing agent is prepared in a shot-add tank. The shot-add tank is pressurized to about 80 psig (pounds per square inch gauge) with nitrogen and the organic phase is pressure transferred to the reactor.

Following the completed loading of the organic and aqueous phases into the reactor, the organic phase is dispersed and sized by agitation for about 30 minutes at about ambient temperature and at a pressure that is slightly above atmospheric.

The reactor is heated to 80° C. (Centigrade) and is held for about 6 hours. The temperature is then increased to about 95° C. for about 1.5 hours. The temperature is then increased again to about 110° C. for about 4 hours and is followed by cooling to ambient temperature. Heating and cooling rates are about 0.5° C./minute.

After cooling the plastic material, now in the form of beads, the reactor is emptied and the beads are washed with water. The beads are then vacuum filtered and dried at ambient conditions.

Tables 3 and 3A contain formulation and process information for several runs. Table 3A, runs 5–8 are the expandable beads whose expansion characteristics are shown in Table 1.

TABLE 3

| Run | 1* | 2* | 3* | 4 |
|---|---|---|---|---|
| Water, g (grams) | 1246 | 1246 | 1246 | 1246 |
| Methyl Methacrylate, g | 976 | 976 | 976 | 974 |
| 1,1,2-trichloro-1,2,2- | 176 | 174 | 183 | 176 |

TABLE 3-continued

| Run | 1* | 2* | 3* | 4 |
|---|---|---|---|---|
| trifluoroethane, g (F-113) | | | | |
| 1,2-dichloro-1,1,2,2-tetrafluoroethane, g (F-114) | 217 | 203 | 207 | 209 |
| Carboxymethyl methycellulose, g | 3.3 | 3.3 | 3.3 | 6.6 |
| $K_2Cr_2O_7$, g | 1.5 | 1.5 | 1.5 | 1.5 |
| t-Butyl-Peroctoate, (50% active) g | 4.56 | 4.56 | 4.56 | 4.56 |
| t-Butyl-Perbenzoate, g | 1.70 | 17.1 | 17.1 | 1.9 |
| Name of chain transfer agent | IOTG[1] | IOTG[1] | $CBr_4$[2] | $CBr_4$[2] |
| Weight of chain transfer agent, g | 3.0 | 5.06 | 3.1 | 4.0 |
| Divinylbenzene, g | 0.0 | 0.0 | 0.0 | .419 |
| Revolutions per Minute for agitator | 180 | 220 | 220 | 220 |
| $Mw \times 10^{-3}$[3] | 371 | 301 | 199 | 264.8 |
| Mw/Mn[4] | 2.5 | 2.1 | 2.4 | 3.6 |
| Volatiles, percent Prior to expansion | 23.7 | 22.85 | 23.9 | 22.85 |

[1]Iso-octyl thioglycoate
[2]Carbon tetrabromide
[3]Weight-average molecular weight
[4]Weight-average molecular weight/number-average molecular weight
*These runs are not examples of the present invention because they did not meet the required expansion characteristics upon expansion.

TABLE 3A

| Run | 5 | 6 | 7 | 8 | 9 |
|---|---|---|---|---|---|
| Water, g (grams) | 3152 | 3075 | 3075 | 3075 | 3075 |
| Methyl Methacrylate, g | 2405 | 2407 | 2406 | 2406 | 2405 |
| 1,1,2-trichloro-1,2,2-trifluoroethane, g (F-113) | 1063 | 0 | 0 | 0 | 935 |
| 1,2-dichloro-1,1,2,2-tetrafluoroethane, g (F-114) | 0 | 0 | 0 | 0 | 238 |
| Neo-hexane | 0 | 214.6 | 542 | 0 | 0 |
| 2,3-dimethylbutane | 0 | 0 | 0 | 537.2 | 0 |
| 1-chloro-1,1-difluoroethane, g (F-142b) | 0 | 375 | 0 | 0 | 0 |
| Carboxymethyl methylcellulose, g | 16.71 | 16.3 | 16.3 | 16.3 | 16.3 |
| $K_2Cr_2O_7$, g | 3.79 | 3.7 | 3.7 | 3.7 | 3.7 |
| t-Butyl-Peroctoate, (50% active) g | 5.51 | 5.51 | 5.51 | 5.51 | 5.51 |
| t-Butyl-Perbenzoate, g | 4.69 | 4.70 | 4.69 | 4.71 | 4.69 |
| Name of chain transfer agent | $CBr_4$[1] | $CBr_4$[1] | $CBr_4$[1] | $CBr_4$[1] | $CBr_4$[1] |
| Weight of chain transfer agent, (55% active) g | 11.34 | 11.34 | 9.64 | 9.64 | 11.34 |
| Divinylbenzene, g | 1.76 | 1.77 | 1.76 | 1.77 | 1.76 |
| Name and weight of inhibitor, ppm | MEHQ 200 | HQ 100 | HQ 100 | HQ 100 | HQ 25 |
| Revolutions per Minute for agitator | 134 | 134 | 134 | 134 | 145 |
| Mw[2] | 264,000 | 271,000 | 258,000 | 267,000 | 257,800 |
| Mw/Mn[3] | 3.3 | 3.2 | 3.1 | 3.0 | 3.3 |
| Volatiles, percent Prior to expansion | 25.3 | 13.4 | 16.0 | 14.5 | 25.6 |

[1]Carbon tetrabromide
[2]Weight-average molecular weight
[3]Weight-average molecular weight/number-average molecular weight (B) Pre-expand the Beads: Use steam or dry air to pre-expand the beads to "pre-foamed" beads having a loose-packed bulk density about equal to 10 percent greater than the planned density of the parts to be molded. Zinc stearate in an amount of about 0.04 to about 0.50 weight percent by total weight may be added as an antistatic and antifusion aid. Preferably, the amount is about 0.10 to about 0.40 weight percent zinc stearate. One example of a typical unexpanded bead resin and its properties are as follows:

| | Resin Poly(methyl methacrylate) |
|---|---|
| Volatiles (as 1,1,2-trichloro-1,2,2-trifluoroethane (F-113) and 1,2-dichloro-1,1,2,2-tetrafluoroethane (F-114)),prior to expansion | 22.8 weight percent |
| Divinylbenzene | 0.043 weight percent |
| Molecular weight (weight average) | about 265,000 |
| Expansion volume, ratio | 24.6 |

Resin
Poly(methyl methacrylate)

| | |
|---|---|
| of unexpanded beads to expanded beads after 5 minutes at 130° C. | |
| Expanded density after 5 minutes at 130° C. | 1.5 pounds per cubic foot |
| Unexpanded bead size range | −30 + 60 mesh (250 to 590 microns) |

A typical operating cycle for pre-expansion based on the use of a horizontally adjusted drum expander with a steam jacket heating system is as follows:

| STEP | FUNCTION | TIME |
|---|---|---|
| 1 | Inject beads into preheated 18 gallon expander. A typical charge size is 0.5 pounds. | 0.1 minute |
| 2 | Preheat beads | 1.4 minutes |
| 3 | Inject 75 cubic centimeters water while pulling a vacuum of 10–12 pounds per square inch absolute (psia). | 0.1 minute |
| 4 | Release to atmospheric pressure and hold. | 0.5 minute |
| 5 | Return to vacuum at about 7 psia and hold. | 0.3 minute |
| 6 | Discharge pre-expanded beads. | 0.75 minute |

By varying the time for expansion or the steam pressure, the density of the expanded beads can be modified. With the operating conditions indicated, the following densities are obtained:

| PREHEAT | STEAM PRESSURE | BEAD DENSITY |
|---|---|---|
| 3 minutes | 24 pounds per square inch gauge (psig) | 1.3 pounds per cubic foot (pcf) |
| 1.4 minutes | 24 psig | 1.5 pcf |

(C) Age the Pre-foamed Beads: If direct contact steam heat is used during the prefoaming or pre-expansion step (B), the beads should be allowed to dry thoroughly before molding. Drying usually is complete within 24 hours when beads are stored in a netting storage hopper.

(D) Mold the Pre-foamed Beads: Molding is generally done on an automatic machine with each step precisely timed. Steps include, but are not limited to: pneumatically filling the mold with beads, passing steam through the mold to heat the beads, cooling the mold with water, and demolding the part.

A typical molding cycle is as follows:

| STEP | FUNCTION | TIME |
|---|---|---|
| 1 | Fill mold with beads pneumatically. | 5 seconds |
| 2 | Steam both sides with 12 to 13 psi steam. | 24 seconds |
| 3 | Steam moving side with 12 psi steam. | 3 seconds |
| 4 | Steam stationary side with 13 psi steam. | 3 seconds |
| 5 | Water cool to about 120 degrees Fahrenheit (°F.) | 6 seconds |
| 6 | Vacuum dwell to remove water. | 4 seconds |
| 7 | Cool dwell. | 90 seconds |
| 8 | Water cool to about 90° F. | 6 seconds |
| 9 | Vacuum dwell. | 6 seconds |
| 10 | Cool dwell. | 90 seconds |
| 11 | Eject part. | — |

The above cycle produces acceptable, smooth-finished, distortion-free parts with a molded density of 1.35 to 1.4 pcf after drying when using pre-expanded beads having a bulk density of 1.5 pcf.

(E) Age the Molded Part: Even with the optimum molding conditions, some moisture is retained in the part. Aging 24–72 hours at ambient conditions removes this water. Alternatively nearly all of the water may be removed in 4–10 hours by drying the molded parts in a circulating air oven heated to 50°–60° C. During the aging step the molded part will achieve final dimensions which will vary only slightly over an extended period of time.

(F) Assembly Pattern Parts: Many complex parts such as manifolds and cylinder blocks are molded in several sections to accommodate constraints on the foam mold design. These are now assembled typically by conventionally gluing with hot melt glue. Due to the fact that the molded part of cellular plastic material employed in the present invention stabilizes at final dimensions quickly and varies in its final dimensions only slightly over an extended period of time, no special precautions are required to assure that all molded parts are at the same stage of aging as long as they are completely dry, as may be required with molded parts of a cellular plastic material not employed in the present invention.

(G) Refractory Coat The Pattern(s): The purposes of the refractory coating are: (1) to provide a finer grained surface than would generally be obtained if the coarser sand directly contacted the foam: (2) to prevent molten metal from flowing out into the sand; and (3) to allow molten polymer, monomer and pyrolysis gases and liquids to escape rapidly during casting. The refractory coating is similar to core washes used widely in the foundry business. Typically the refractory coating consists of fine mesh refractory particles suspended in a water or alcohol slurry with suitable surfactants to control viscosity and assure good wetting.

Core washes may be applied by dipping, spraying or brushing on the slurry. Following application the refractory coating is cured by air drying at ambient temperatures or elevated temperatures up to about 60° C.

The porosity and surface properties of the refractory in the coating are very important parameters since they affect the pressure in the mold during pouring and the retention of metal inside the mold. Both factors directly influence the final quality of the molded part.

(H) Attach Molded Parts to Gates, Runners, and Sprues: Hot melt glue may be used. Since gates, runners, and sprues must also have a refractory coating, it may be desirable to make the complete assembly before applying the refractory coating as described in step F.

(I) Pack Foam Pattern(s) Attached to the Needed Sprue(s) Assembly(s) in Sand in a Flask for Pouring: In this step, the refractory coated parts and sprue assembly having a deep pour cup with about 8 to 12 inches free board above the sprue is supported while dry, loose foundry sand containing no binders is poured into the flask. Optionally, the flask can be vibrated on a 1 to 3 axis vibration platform during filling and for a period after filling is complete to tightly pack the sand around the pattern.

(J) Pour the Casting: Pouring is done with standard procedures used for other casting methods, such as the "green sand" method. The rate of pouring must be rapid enough to keep the sprue filled to the surface of the sand. The sizes of the gates and runners are optimized to give the best fill rate at the static head obtained with a full sprue.

(K) Allow the Casting to Solidify and Cool: Care should be taken not to jar the flask before solidification is completed.

(L) Shake Out the Flask: In this step the casting and sprue system is removed from the flask either by pulling out the casting or by dumping out the sand and removing the casting.

(M) Cleanup of the Cast Parts: This may include air or water jet cleaning, shot blasting and machining of flange faces. A preliminary inspection to reject off-spec parts should be done.

(N) Complete Machining: Drill and tap holes, cut 0-ring grooves, etc.

(O) Quality Check: Test parts for leaks, defects, dimensional specs, etc., prior to assembly and use.

Additional Examples

Additional Examples of the invention concerning factors such as type of chain transfer agent, and the ability to cast articles having a very low and uniform carbon content throughout the casting are given.

EXAMPLE 1

Four formulations of a poly(methyl methacrylate) cellular plastic material are prepared having the following properties:

|  | Number | | | |
|---|---|---|---|---|
|  | 1 | 2 | 3 | 4 |
| Molded density pcf | 1.43 | 1.35 | 1.35 | 1.40 |
| Molecular weight (weight average) | 371,000 | 265,000 | 301,000 | 199,000 |
| Divinyl Benzene Agent | 0.0 | 0.043 | 0.0 | 0.0 |
| Volatiles (as F-113 plus F-114, weight percent, prior to expansion) | 23.7 | 22.85 | 22.85 | 23.9 |
| Chain transfer agent | IOTG | $CBr_4$ | IOTG | $CBr_4$ |

Molded cellular plastic material blocks 8 inches (in.) by 8 in. by 2 in. of the above formulations are used to make the desired patterns, sprues and runners. The parts are assembled into a complete casting pattern system and refractory coated.

The patterns are then packed in a flask with sand. The patterns are packed, for this example, with their thickness in a vertical direction. The patterns are:

| Thickness | Length | Width |
|---|---|---|
| 2 in. | 8 in. | 8 in. |
| 1 in. | 8 in. | 8 in. |
| ½ in. | 8 in. | 8 in. |
| ¼ in. | 8 in. | 8 in. |
| 8 in. | 4 in. | 2 in. |

All formulations are cast in each thickness, with the exception of formulation number 1 which is not cast in the 2 in. and 8 in. thickness. The 8 in. thickness pattern is gated at the bottom of the pattern and at approximately half the thickness of the pattern.

Ductile iron, having about 3.5 percent carbon, at approximately 2650° F. is used for all patterns.

The reduction in carbon defect is readily apparent in all the castings, which have no visual surface carbon defects.

The lack of carbon defect in the 2 in. thick and 8 in. thick patterns, in particular, indicates an important advantage in using the method of the present invention. This advantage is the capability of providing carbon defect-free castings with a wide variety of gating systems. Due to the lack of carbon defects and residue, there is no need to optimize the gating system to avoid carbo defects, thus saving time and money.

EXAMPLE 2

Three formulations of a poly(methyl methacrylate) cellular plastic material are prepared having the following properties:

| Block Number | 1 | 2 | 3 |
|---|---|---|---|
| Molded density pcf | 1.33 | 1.36 | 1.66 |
| Chain transfer agent | $CBr_4$ | $CBr_4$ | IOTG |

Molded cellular blocks of the above formulations are used to make the desired patterns, sprues and runners. The parts are assembled into a complete casting pattern system and refractory coated.

The patterns are then packed in a flask with sand.

Stainless steel, having about 0 035 percent carbon is used for all patterns.

The final carbon percentage at each of five points in each of the cast patterns is then determined in duplicate. The results are presented in Table 4.

TABLE 4

| | Block Number | | | | | |
|---|---|---|---|---|---|---|
| | 1 | | 2 | | 3 | |
| | Final Percent Carbon After Castin Determination | | | | | |
| Points | First | Second | First | Second | First | Second |
| 1 | 0.048 | 0.053 | 0.082 | 0.067 | 0.105 | 0.056 |
| 2 | 0.040 | 0.049 | 0.043 | 0.049 | 0.083 | 0.052 |
| 3 | 0.042 | 0.039 | 0.041 | 0.039 | 0.085 | 0.064 |
| 4 | 0.056 | 0.045 | 0.050 | 0.047 | 0.055 | 0.052 |
| 5 | 0.048 | 0.051 | 0.062 | 0.057 | 0.075 | 0.085 |

The final carbon percentages are within the specification percentage of carbon for many stainless steels and stainless steel alloys, although for the specific stainless steel of this example, the carbon percentages exceeded the specification carbon percentage of 0.040, due at least in part to the fact that this particular stainless steel had about 0.035 percent carbon prior to casting.

Although only a few embodiments of the present invention have been shown and described, it should be apparent that various changes and modifications can be made without departing from the scope of the present invention as claimed.

What is claimed is:

1. An expandable plastic material particle comprising:

(A) a plastic material, polymerized from one or more monomers, containing a majority, by weight of the plastic material, of monomeric repeat units of the formula:

$$\text{-}[CH_2CR'(COOR)]\text{-}$$

wherein R is selected from the group consisting of alkanes having 1–4 carbon atoms (C), hydroxy alkanes having 1–4 C and cycloalkanes having 3–6 C, and R' is selected from the group consisting of $CH_3$ and $C_2H_5$;

(B) a volatile blowing agent contained within the plastic material;

(C) an inhibitor for the monomer(s) incorporated into the plastic material upon polymerization of the monomer(s); and (D) a diunsaturated polymerizable monomer cross-linking agent incorporated into the plastic material upon polymerization of the monomer(s) to provide cross-linking of the plastic material.

2. An expandable plastic material particle, as recited in claim 1, wherein the inhibitor is present, prior to incorporation into the plastic material, at a level of about at least 25 parts by weight per million parts by weight of the monomer(s).

3. An expandable plastic material particle, as recited in claim 2, wherein the inhibitor is present, prior to incorporation into the plastic material, at a level of about at least 50 parts per million parts of the monomer(s).

4. An expandable plastic material particle, as recited in claim 3, wherein the crosslinking agent is present, prior to incorporation into the plastic material, in an amount of from about $1.5 \times 10^{-4}$ to about $6.2 \times 10^{-4}$ moles of crosslinking agent per mole of the monomer(s).

5. An expandable plastic material particle, as recited in claim 4, wherein the crosslinking agent is present, prior to incorporation into the plastic material, in an amount of from about $3.1 \times 10^{-4}$ to about $4.6 \times 10^{-4}$ moles of crosslinking agent per mole of the monomer(s).

6. An expandable plastic material particle, as recited in claim 5, wherein the crosslinking agent is divinyl benzene.

7. An expandable plastic material particle, as recited in claim 6, wherein the inhibitor is selected from the group consisting of hydroquinone and methoxyhydroquinone.

8. An expandable plastic material particle, as recited in claim 7, wherein the plastic material has a majority of repeat units of the formula:

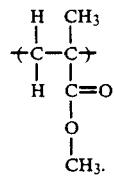

9. An expandable plastic material particle, as recited in claim 8, wherein the plastic material has an apparent weight average molecular weight in the range of 220,000 to 320,000 and a poly-dispersity of at least 2.7.

10. An expandable plastic material particle, as recited in claim 9, wherein the plastic material is poly(methyl methacrylate).

11. An expandable plastic material particle, as recited in claim 10, wherein the plastic material is poly(methyl methacrylate) which has been polymerized in the presence of a chain transfer agent.

12. An expandable plastic material particle, as recited in claim 11, wherein the plastic material is poly(methyl methacrylate) prepared with a chain transfer agent of carbon tetrabromide.

13. An expandable plastic material particle, as recited in claim 12, wherein the chain transfer agent of carbon tetrabromide is present, prior to incorporation into the plastic material, in an amount of from about $2.51 \times 10^{-4}$ to about $20.10 \times 10^{-4}$ moles of chain transfer agent per mole of methyl methacrylate monomer.

14. An expandable plastic material particle, as recited in claim 13, wherein the chain transfer agent of carbon tetrabromide is present, prior to incorporation into the plastic material, in an amount of from about $5.02 \times 10^{-4}$ to about $20.10 \times 10^{-4}$ moles of chain transfer agent per mole of methyl methacrylate monomer.

15. An expandable plastic material particle, as recited in claim 14, wherein the volatile blowing agent contained within the plastic material is present in an amount of from about 0.09 moles to about 0.21 moles of blowing agent per mole of polymerized methyl methacrylate monomer.

16. An expandable plastic material particle, as recited in claim 15, wherein the volatile blowing agent contained within the plastic material is present in an amount of from about 0 15 moles to about 0.19 moles of blowing agent per mole of polymerized methyl methacrylate monomer.

17. An expandable plastic material particle, as recited in claim 16, wherein the volatile blowing agent is selected from the group consisting of:

(a) 1,1,2-trichloro-1,2,2-trifluoroethane:

(b) a mixture having at least 20 weight percent of 1,1,2-trichloro-1,2,2-trifluoroethane by weight of the mixture, with the remainder of the mixture selected from the group consisting of:

(1) 1,2-dichloro-1,1,2,2-tetrafluoroethane: and (2) one or more other volatile blowing agents:

(c) 2,2-dimethylbutane:

(d) 2,3 TM dimethylbutane:

(e) a mixture of 2,2-dimethylbutane and 2,3-dimethylbutane;

(f) a mixture of (c), (d) and (e) with 1-chloro-1,1-difluoroethane; and (g) a mixture of at least 30 percent of (c), (d) and (e) by weight of the mixture with one or more other volatile blowing agents.

18. An expanded closed-cell cellular plastic material article comprising:

(A) a plastic material, polymerized from one or more monomers, containing a majority, by weight of the plastic material, of monomeric repeat units of the formula:

$$\text{-}[CH_2CR'(COOR)]\text{-}$$

wherein R is selected from the group consisting of alkanes having 1–4 carbon atoms (C), hydroxy alkanes having 1–4 C and cycloalkanes having 3–6 C, and R' is selected from the group consisting of $CH_3$ and $C_2H_5$;

(B) a volatile blowing agent entrapped in the expanded closed-cell cellular plastic material;

(C) an inhibitor for the monomer(s) incorporated into the plastic material upon polymerization of the monomer(s); and (D) a diunsaturated polymerizable monomer crosslinking agent incorporated into the plastic material upon polymerization of the monomer(s) to provide crosslinking of the plastic material.

19. An expanded closed-cell cellular plastic material article, as recited in claim 18, wherein the inhibitor is present, prior to incorporation into the plastic material, at a level of about at least 25 parts by weight per million parts by weight of the monomer(s).

20. An expanded closed-cell cellular plastic material article, as recited in claim 19, wherein the inhibitor is present, prior to incorporation into the plastic material, at a level of about at least 50 parts by weight per million parts by weight of the monomer(s).

21. An expanded closed-cell cellular plastic material article, as recited in claim 20, wherein the crosslinking agent is present, prior to incorporation into the plastic material, in an amount of from about $1.5 \times 10^{-4}$ to about $6.2 \times 10^{-4}$ moles of crosslinking agent per mole of the monomer(s).

22. An expanded closed-cell cellular plastic material article, as recited in claim 21, wherein the crosslinking agent is present, prior to incorporation into the plastic material, in an amount of from about $3.1 \times 10^{-4}$ to about $4.6 \times 10^{-4}$ moles of crosslinking agent per mole of the monomer(s).

23. An expanded closed-cell cellular plastic material article, as recited in claim 22, wherein the crosslinking agent is divinyl benzene.

24. An expanded closed-cell cellular plastic material article, as recited in claim 23, wherein the inhibitor is selected from the group consisting of hydroquinone and methoxyhydroquinone.

25. An expanded closed-cell cellular plastic material article, as recited in claim 24, wherein the plastic material has a majority of repeat units of the formula:

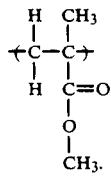

26. An expanded closed-cell cellular plastic material article, as recited in claim 25, wherein the plastic material has an apparent weight average molecular weight in the range of about 220,000 to about 320,000 and a polydispersity of at least about 2.7.

27. An expanded closed-cell cellular plastic material article, as recited in claim 26, wherein the plastic material is poly(methyl methacrylate).

28. An expanded closed-cell cellular plastic material article, as recited in claim 27, wherein the plastic material is poly(methyl methacrylate) prepared with a chain transfer agent.

29. An expanded closed-cell cellular plastic material article, as recited in claim 28, wherein the plastic material is poly(methyl methacrylate) prepared with a chain transfer agent of carbon tetrabromide.

30. An expanded closed-cell cellular plastic material article, as recited in claim 29, wherein the chain transfer agent of carbon tetrabromide is present, prior to incorporation into the plastic material, in an amount of from about $2.51 \times 10^{-4}$ to about $20.10 \times 10^{-4}$ moles of chain transfer agent per mole of methyl methacrylate monomer.

31. An expanded closed-cell cellular plastic material article, as recited in claim 30, wherein the chain transfer agent of carbon tetrabromide is present, prior to incorporation into the plastic material, in an amount of from about $5.02 \times 10^{-4}$ to about $20.10 \times 10^{-4}$ moles of chain transfer agent per mole of methyl methacrylate monomer.

32. An expanded closed-cell cellular plastic material article, as recited in claim 31, wherein the volatile blowing agent contained within the plastic material is present in an amount of from about 0.06 moles to about 0.18 moles of blowing agent per mole of polymerized methyl methacrylate monomer.

33. An expanded closed-cell cellular plastic material article, as recited in claim 32, wherein the entrapped volatile blowing agent is selected from the group consisting of:
(a) 1,1,2-trichloro-1,2,2-trifluoroethane;
(b) a mixture having at least 20 weight percent of 1,1,2-trichloro-1,2,2-trifluoroethane by weight of the mixture, with the remainder of the mixture selected from the group consisting of:
  (1) 1,2-dichloro-1,1,2,2-tetrafluoroethane; and
  (2) one or more other volatile blowing agents:
(c) 2,2-dimethylbutane:
(d) 2,3-dimethylbutane:
(e) a mixture of 2,2-dimethylbutane and 2,3-dimethylbutane;
(f) a mixture of (c), (d) and (e) with 1-chloro-1,1-difluoroethane; and
(g) a mixture of at least 30 percent of (c), (d) and (e) by weight of the mixture with one or more other volatile blowing agents.

34. An expanded closed-cell cellular plastic material article, as recited in claim 18, wherein the cellular plastic material has a density of 0.7 to 5.0 pounds per cubic foot.

35. An expanded closed-cell cellular plastic material article, as recited in claim 18, wherein the cellular plastic material has a density of 1.0 to 2.2 pounds per cubic foot.

* * * * *

UNITED STATES PATENT AND TRADEMARK OFFICE
CERTIFICATE OF CORRECTION

PATENT NO. : 4,983,640

DATED : January 8, 1991

INVENTOR(S) : Norman Glenn Moll and David Richard Johnson

It is certified that error appears in the above-identified patent and that said Letters Patent is hereby corrected as shown below:

Title page, under the Abstract, line 12, insert a --a-- after the word having.

Title page, under the Abstract, line 24, "uncenomic" should correctly appear as --uneconomic--.

Column 1, line 12, delete the number "1.".

Column 1, line 27, delete the number "2.".

Column 1, line 55, "copolymer" should correctly appear as --copolymers--.

Column 2, line 38, "castings:" should correctly appear as --castings;--.

Column 2, line 40, "castings:" should correctly appear as --castings;--.

Column 2, line 64, "conditions:" should correctly appear as --conditions;--.

Column 2, line 65, "60:" should correctly appear as --60;--.

Column 3, line 19, "(a) 2,2-dimethylbutane" should correctly appear as --(a) 2,2-dimethylbutane;--.

Column 3, line 21, "(c) 2,2-dimethylbutane and 2,3 TM dimethylbutane" should correctly appear as --(c) 2,2-dimethylbutane and 2,3 dimethylbutane--.

UNITED STATES PATENT AND TRADEMARK OFFICE
CERTIFICATE OF CORRECTION

PATENT NO. : 4,983,640

DATED : January 8, 1991

INVENTOR(S) : Norman Glenn Moll and David Richard Johnson

It is certified that error appears in the above-identified patent and that said Letters Patent is hereby corrected as shown below:

Column 3, line 46, "60:" should correctly appear as --60;--.

Column 3, line 64, "(a) 2,2-dimethylbutane:" should correctly appear as --(a) 2,2-dimethylbutant;--.

Column 4, line 65, "monomer(s):" should correctly appear as --monomer(s);--.

Column 5, line 27, "(2) a steel:" should correctly appear as --(2) a steel;--.

Column 5, line 28, "(3) a stainless steel:" should correctly appear as --(3) a stainless steel;--.

Column 8, line 26, "conditions; 1 (ii)" should correctly appear as --conditions; (ii)--.

Column 9, line 50, delete the number "1".

Column 10, line 30, "-CH$_2$CR'(COOR)-" should correctly appear as -- $\pm$CH$_2$CR'(COOR)$\pm$ --.

Column 10, line 50, "densities" should correctly appear as --densities.--.

Column 10, line 66, "1 8" should correctly appear as --1.8--.

UNITED STATES PATENT AND TRADEMARK OFFICE
CERTIFICATE OF CORRECTION

PATENT NO. : 4,983,640

DATED : January 8, 1991

INVENTOR(S) : Norman Glenn Moll and David Richard Johnson

It is certified that error appears in the above-identified patent and that said Letters Patent is hereby corrected as shown below:

Column 14, line 23, "steels "." should correctly appear as --steels."--.

Column 14, line 25, "steels:" should correctly appear as --steels;--.

Column 14, line 37, "0 01" should correctly appear as --0.01--.

Column 15, line 12, "1,1,2 2-tetrafluoroethane" should correctly appear as --1,1,2,2-tetrafluoroethane--.

Column 15, line 20 "(1) 1,2-dichloro-1,1,2,2-tetrafluoroethane: and" should correctly appear as --(1) 1,2-dichloro-1,1,2,2-tetrafluoroethane; and--.

Column 15, line 23, "(d) 2,3-dimethylbutane:" should correctly appear as --(d) 2,3-dimethylbutane;--.

Column 15, line 27, "difluoroethane:" should correctly appear as --difluoroethane;--.

Column 15, line 31, "1,1,2-trichloro-1,2,2trifluoroethane," should correctly appear as --1,1,2-trichloro-1,2,2-trifluoroethane,--.

Column 16, Table A, delete "16.71" proceding the word Carboxymethyl methylcellu-; "lose," under "Carboxymethyl " should correctly appear as --lose, g--; and the "g" under "16.71" should correctly appear as --16.71--.

Column 22, line 38, "foam:" should correctly appear as --foam;--.

UNITED STATES PATENT AND TRADEMARK OFFICE
CERTIFICATE OF CORRECTION

PATENT NO.   : 4,983,640

DATED        : January 8, 1991

INVENTOR(S)  : Norman Glenn Moll and David Richard Johnson

It is certified that error appears in the above-identified patent and that said Letters Patent is hereby corrected as shown below:

Column 24, line 18, "carbo" should correctly appear as --carbon--.

Column 24, line 38, "0 035" should correctly appear as --0.035--.

Column 24, line 46, of Table 4, "Castin" should correctly appear as --Casting--.

Column 25, line 6, "$\pm CH_2CR'(COOR)\pm$" should correctly appear as --$\pm CH_2CR'(COOR)\pm$--.

Column 26, line 28, "0 15" should correctly appear as --0.15--.

Column 26, line 34, "1,2,2-trifluoroethane:" should correctly appear as --1,2,2-trifluoroethane;--.

Column 26, line 39, "(1) 1,2-trichloro-1,1,2,2-trifluoroethane:" should correctly appear as --(1) 1,1,2-trichloro-1,2,2-trifluoroethane;--.

Column 26, line 40, "agents:" should correctly appear as --agents;--.

Column 26, line 41, "(c) 2,2-dimethylbutane:" should correctly appear as --(c) 2,2-dimethylbutane;--.

Column 26, line 42, "(d) 2,3 TM dimethylbutane:" should correctly appear as --(d) 2,3-dimethylbutane;--.

Column 28, line 38, "(c) 2,2-dimethylbutane:" should correctly appear as --(c) 2,2-dimethylbutane;--.

UNITED STATES PATENT AND TRADEMARK OFFICE
CERTIFICATE OF CORRECTION

PATENT NO. : 4,983,640

DATED : January 8, 1991

INVENTOR(S) : Norman Glenn Moll and David Richard Johnson

It is certified that error appears in the above-identified patent and that said Letters Patent is hereby corrected as shown below:

Column 28, line 39, "(d) 2,3-dimethylbutane:" should correctly appear as --(d) 2,3-dimethylbutane;--.

Signed and Sealed this

Seventeenth Day of November, 1992

Attest:

DOUGLAS B. COMER

Attesting Officer

Acting Commissioner of Patents and Trademarks